United States Patent [19]

Fletcher et al.

[11] Patent Number: 4,777,633
[45] Date of Patent: Oct. 11, 1988

[54] BASE STATION FOR WIRELESS DIGITAL TELEPHONE SYSTEM

[75] Inventors: Thomas E. Fletcher; Wendeline R. Avis; Gregory T. Saffee, all of San Diego; Karle J. Johnson, Carlsbad, all of Calif.

[73] Assignee: International Mobile Machines Corp., Philadelphia, Pa.

[21] Appl. No.: 71,279

[22] Filed: Aug. 14, 1987

[51] Int. Cl.⁴ ............................................... H04J 3/02
[52] U.S. Cl. ..................... 370/50; 370/109; 379/59
[58] Field of Search ............ 370/109, 97, 95, 93, 370/50; 379/56, 59, 63; 455/33, 54, 56, 69

[56] References Cited

U.S. PATENT DOCUMENTS 4,215,244 7/1980 Gutleber .............................. 370/116
4,443,661 4/1984 Kubo ..................................... 455/33
4,608,711 8/1986 Goldman ............................. 455/33

Primary Examiner—Douglas W. Olms
Assistant Examiner—Melvin Marcelo
Attorney, Agent, or Firm—Arthur A. Jacobs; Edward W. Callan

[57] ABSTRACT

A base station for use in a subscriber communication network for communicating signals between subscriber stations and an external communication network having a plurality of ports includes a communication circuit for enabling simultaneous communications between a plurality of the ports and a plurality of the subscriber stations over a given communication channel having multiple sequentially repetitive time slots; an exchange for connecting the communication circuit to the external communication network ports; and a remote-connection processor coupled to the communication circuit by the exchange and by a base-station control channel occupying a selected one of the time slots for monitoring the status of the other time slots and for causing the communication circuit and the exchange to complete a connection between a given external communication network port and a given subscriber station over a time slot assigned in response to the monitored status in accordance with a predetermined assignment routine.

15 Claims, 5 Drawing Sheets

BASE STATION FOR WIRELESS DIGITAL TELEPHONE SYSTEM

BACKGROUND OF THE INVENTION

The present invention generally pertains to communications systems and is particularly directed to an improved base station for use in a subscriber communication network, such as a wireless digital telephone system.

A base station for a wireless telephone system having a plurality of subscriber stations is described in U.S. Pat. No. 4,675,863 issued June 23, 1987, for "Subscriber RF Telephone System For Providing Multiple Speech And/Or Data Signals Simultaneously Over Either A Single Or A Plurality of RF Channels".

The base station described in the above-referenced patent communicates signals between subscriber stations and an external communication network having a plurality of ports. Such base station includes a communication circuit for enabling simultaneous communications between a plurality of the ports and a plurality of subscriber stations over a given communication channel having multiple sequentially repetitive time slots, with predetermined time slots being assigned respectively to predetermined subscriber stations; a remote-connection processor (RPU) for directing communications between the time slot assigned to a given subscriber station and a given port; and an exchange for connecting the communication circuit to the ports. The exchange includes a switch, which responds to a control signal from the RPU by physically connecting a selected port to a selected communication channel time slot assigned to a given subscriber station. The communication circuit includes a plurality of channel control units (CCUs) for coupling the assigned communication channel time slot to the given subscriber station in response to a command signal communicated by the RPU to CCU's over a base-station control channel (BCC) in response to status messages provided over the BCC to the RPU to indicate the usage status of the communication channel time slots and the subscriber stations. The assigned communication channel time slot is coupled to the given subscriber station by an assigned time slot in an assigned radio frequency (RF) channel. The BCC is provided over lines seprately connected directly from the RPU to each of the CCUs. Control commands and status messages are communicated between the CCUs and the subscriber stations over a radio control channel (RCC) assigned to a predetermined time slot of a predetermined RF channel.

SUMMARY OF THE INVENTION

The present invention provides an improved base station for use in a subscriber communication network for communicating signals between subscriber stations and an external communication network having a plurality of ports. The base station of the present invention includes a communication circuit, an exchange, preferably n the form of a concentrator, and a remote-connection processor. The communication circuit includes a trunk for providing a communication channel; and a multiplexer coupled to the trunk for providing multiple sequentially repetitive time slots in the communication channel for enabling simultaneous communications between a plurality of the ports and a plurality of the subscriber stations over the communication channel. The exchange connects the trunk to the external communication network ports. The remoteconnection processor is coupled to the communication circuit by a base-station control channel (BCC) and to the exchange for monitoring the status of the time slots and for causing the communication circuit and the exchange to complete a connection between a given external communication network port and a given subscriber station over a time slot assigned in response to the monitored status in accordance with a predetermined assignment routine.

In one aspect of the present invention, the communication circuit further includes a plurality of channel control units (CCUs) coupled to the multiplexer for coupling assigned time slots to given subscriber stations; and plurality of communication signal processors coupled to given subscriber stations by the channel control units in response to command signals from the remoteconnection processor. The communication signal processors are respectively coupled by the multiplexer to predetermined time slots of the communication channel carried over the trunk, wherein each communication signal processor provides a predetermined signal pattern in its predetermined time slot when not coupled by its channel control unit to the remote-connection processor. The exchange is responsive to a command from the remote-connection processor for causing a signal received by the exchange from one of the communication signal processors over a given time slot to be looped back to the communication signal processor coupled to that time slot; and each communication signal processor is coupled to one of the channel control units for enabling the coupled channel control unit in response to a said looped-back predetermined signal pattern to receive commands from the remoteconnection processor for assigning the communication signal processor that receives the looped-back predetermined signal pattern to communicate with a given subscriber station.

In another aspect of the present invention, the communication circuit includes a plurality of trunks for providing a plurality of communication channels; a plurality of multiplexers coupled to the plurality of trunks for providing multiple sequentially repetitive time slots in each of the communication channels for enabling simultaneous communications between a plurality of the ports and a plurality of the subscriber stations over the communication channels; a plurality of channel control units coupled to the multiplexers for coupling assigned time slots to given subscriber stations; a plurality of controllers repsectively coupled to the multiplexers; and a local bus between the controllers and the channel control units. In accordance with the monitored status, the remote-connection processor selects one of the time slots to carry the base-station control channel and causes the controller that is coupled to the multiplexer that is coupled to the trunk that carries the time slot selected to carry the base-station control channel to function as a primary controller for coupling the base-station control channel over the local bus to the other controllers and to the channel control units for enabling the remote-connection processor to monitor the status of the other time slots and to assign the other time slots.

In still another aspect of the present invention, the communication circuit includes a plurality of trunks for providing a plurality of communication channels; and a plurality of multiplexers coupled to the plurality of trunks for providing multiple sequentially repetitive time slots in each of the communication channels for enabling simultaneous communications between a plurality of the ports and a plurality of the subscriber stations over the communication channels; a plurality of channel control units coupled to the multiplexers for coupling assigned time slots to given subscriber stations, with each channel control unit coupling a plurality of assigned time slots to a corresponding plurality of subscriber stations; The assignment routine includes assigning all of the time slots associated with any given channel control unit before assigning time slots associated with another channel control unit, and then assigning time slots associated with a channel control unit coupled to a different multiplexer than the multiplexer coupled to the channel control unit associated with the previously assigned time slots.

Accordingly, the base station of the present invention is capable of handling a large number of communications involving a large number of subscriber stations with great flexibility.

Additional features of the present invention are described with reference to the description of the preferred embodiment.

GLOSSARY OF ACRONYMS

ACK : Acknowledge
AMI : Alternate Mark Inversion
BCC : Base-station Control Channel
BEC : Bit Error Count
CCU : Channel Control Unit
CCT : Channel Control Task
CM : Channel Module
CO : Central Office
COT : Central Office Terminal
CPU : Central Processing Unit
CRC : Cyclic Redundancy Check
EEPROM : Electrically Erasable Programmable Read Only Memory
EPROM : Electrically Programmable Read Only Memory
FCS : Frame Check Sequence
FIFO : First In First Out
HEX : Hexadecimal
LSB : Least Significant Bit
MPM : Message Processing Module
MSB : Most Significant Bit
MTU : Master Timing Unit
MUX : Multiplexer
MTMU : Master Timing & Multiplexer Unit
NRZ : Non-Return to Zero
OCXO : Oven Controlled Crystal Oscillator
PCM : Pulse Code Modulation
PLL : Phase Locked Loop
RAM : Random Access Memory
RCC : Radio Control Channel
RPU : Remote-connection Processing Unit
RRT : Remote Radio Terminal
RX : Receive
RZ : Return to Zero
SCT : Subscriber Control Task
SDLC : Synchronous Data Link Control
SID : Subscriber Identification
SIDX: Subscriber Index
SIU : Serial Interface Unit
STAD INIT : Station Address Initialization
TC : Terminal Count
TDM : Time Division Multiplexed
TTL : Transistor-transistor logic
TX : Transmit
UART : Universal Asynchronous Receiver Transmitter
UW : Unique Word
VCU : Voice Codec Unit
VCXO : Voltage Controlled Crystal Oscillator
ZBI : Zero Bit Insertion

DESCRIPTION OF THE PREFERRED EMBODIMENT

Figure 1:
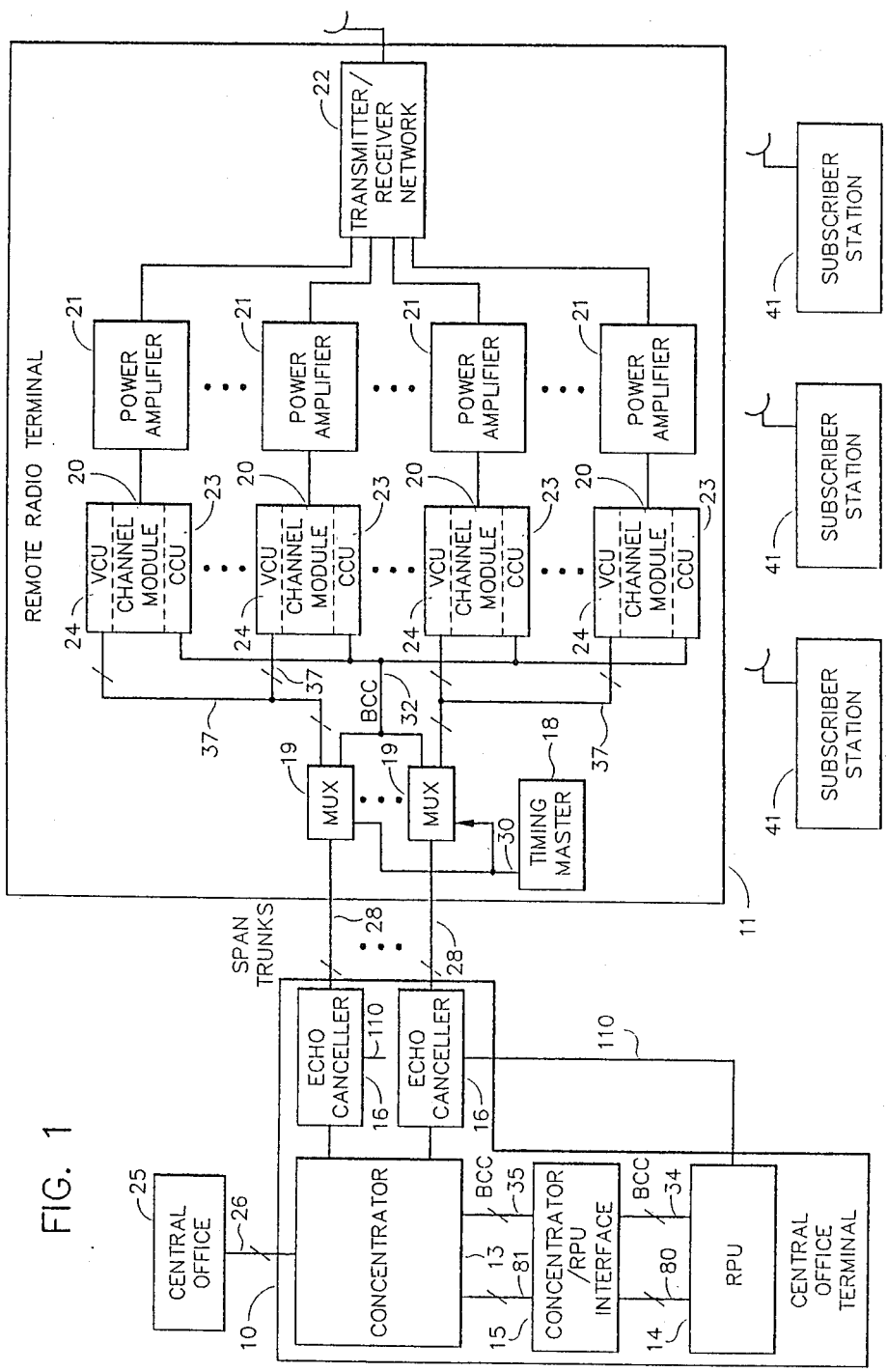
FIG. 1 is a block diagram of a preferred embodiment of the base station of the present invention.

Referring to FIG. 1, a preferred embodiment of the base station of the present invention includes a central office terminal (COT) 10 and a remote radio terminal (RRT) 11. The COT 10 includes a concentrator 13, a remote-connection processor unit (RPU) 14, a concentrator/RPU interface unit 15, and a plurality of echo canceller units 16. The RRT 11 includes a master timing unit (MTU) 18, a plurality of multiplexers (MUXs) 19, a plurality of channel modules 20, a plurality of power amplifiers 21 and a transmitter/receiver network 22. Each of the channel modules 20 includes a channel control unit (CCU) 23. The channel modules 20 and the transmitter receiver network 22 are described in the first above-referenced patent application.

The concentrator 13 communicates with a telephone company central office 25 over a plurality of two-wire-appearance lines 26. The concentrator 13 communicates with the MUXs 19 in the RRT 11 over a plurality of span trunks 28. Each of the span trunks 28 carries digital information in a plurality of multiplexed time slots provided by the respective MUX 19 to which the span trunk 28 is connected. The number of time slots is smaller than the number of appearances, thereby producing a concentration of external circuits. The ratio of appearances to time slots is the same as the ratio of subscribers to time slots. The device providing the first ratio is referred to as an "concentrator", or specifically in the present instance as a concentrator. The device providing the second ratio is referred to as an "expander" which comprises the remote radio terminal (RRT), the subscriber stations and the RPU which acts as a control for both the RRT and the subscriber stations.

The digital information may be voice data or other data. The voice data coding technique is digital information. Voice signals carried over the span trunks 28 are passed from and to the concentrator 13 through the echo cancelers 16 in the COT 10.

The MTU 18 provides timing signals to the MUXs 19 over a timing bus 30.

The RPU 14 is coupled by the concentrator 13 to the MUXs 19 for communicating with the MUXs 19 and the CCUs 23 over a base-station control channel (BCC), which occupies one of the time slots on one of the span trunks 28 and which is coupled between the MUXs 19 and the CCUs 23 by a local BCC bus 32. The BCC channel between the RPU 14 and the concentrator 13 is provided by lines 34 between the RPU 14 and the concentrator/RPU interface unit 15 and by lines 35 between the concentrator/RPU interface unit 15 and the concentrator 13.

Each of the MUXs 19 is connected to a plurality of the channel modules 20 by a plurality of separate lines 37. A plurality of voice and data channels are provided over each of the lines 37 for communicating with a plurality of subscriber stations 41 through each of the channel modules 20. Each of the channel modules 20 is coupled to the transmitter/receiver network 22 by one of the power amplifiers 21 for communicating with a plurality of subcriber stations 41 over a corresponding plurality of time slots in an RF channel.

The operation of the base station is described in relation to the description of a specific preferred embodiment having certain quantitative parameters that are exemplary and do not limit the scope of the present invention.

The RRT 11 can in some installations be colocated with the COT 10. In these types of installations, the span trunks 28 are standard twisted-pair cables which are used to connect the RRT 11 to the COT 10. Due to the fact that the RRT 11 requires a somewhat line-of-sight path to the subscriber stations 41, a more typical installation of the RRT 11 is remote from the COT 10 and occupies a high point in the surrounding terrain. In this case, a microwave, fiber optic, or long cable link is used to provide the transmission medium between the COT 10 and the RRT 11.

Each span trunk 28 is a T1 trunk that is capable of carrying a timedivision-multiplexed (TDM) DS1 signal. The DS1 signal provides 24 time slots, each containing one byte of digital information. Therefore up to 24 simultaneous circuits can be supported by one span trunk 28. The MUXs 19 establish frame timing in order to demultiplex the digital information. Once frame timing is established, the individual bytes can be extracted for the appropriate channel modules 20.

Each channel module 20 supports one UHF RF channel. Each RF channel in turn is divided into four usable time slots. Accordingly one RF channel can support simultaneous circuits with up to four subscriber stations. Since each span trunk 28 can support up to 24 simultaneous circuits, each MUX 19 must be able to communicate with up to six channel modules 20.

Each of the MUXs 19 is embodied in a modular card that is capable of handling up to 24 simultaneous circuits only or 23 simultaneous circuits plus the BCC. The MUXs 19 include the hardware required to extract the data from the trunks 28 and to distribute it to the channel modules 20. The MUX card 19 provides all of the necessary timing signals for the channel modules 20 to extract the correct digital information. Each MUX card 19 contains the circuitry needed to transmit and receive a DS1-format waveform and provide sufficient drive capability for the maximum span trunk 28 length.

The base station may contain up to six MUX cards 19 and therefore provides the capability of supporting up to 36 RF channels.

The concentrator 13 comprises a Model 1218C digital image concentrator provided with a switch; this unit being available from ITT Corporation of New York, N.Y., USA.

The RPU 14 comprises an Alcyon computer available from Alcyon Corp. of San Diego, Calif. The RPU 14 has ultimate control of both the concentrator 13 and the RRT 11. The RPU 14 processes subscribers' requests to set up the required transmission path between the subscriber stations 41 and the central office 25.

To support the BCC bus 32, each MUX card 19 contains a microcontroller 44 with a built-in synchronous data link control (SDLC) controller. Hardware in the MUX card 29 can remove and insert data in the BCC, which occupies the first channel of the DS1 data stream of one of the span trunks 28. This data is processed by the microcontroller which then generates the appropriate messages on the BBC bus 32 to effect any commands issued over the BCC by the RPU 14. Only one MUX card 19 out of the possible six in the base station receives the BCC from the RPU 14 at any given time. Only this card will insert data into the first channel of a selected span trunk 28, as well as provide the primary microcontroller for the BCC bus 32. This MUX card is referred to as the primary MUX card. The remaining MUX cards 19 allow the respective first channels of the span trunks to which they are connected to be used as a digital information slot for a channel module 20 and configure their microcontrollers to act as BCC bus secondaries. The primary MUX will also provide appropriate signals to control the MTU 18 as well as to receive status messages that are provided to the RPU 14 over the BCC occupying the first channel of the span trunk 28 connected to the primary MUX card.

Figure 2:
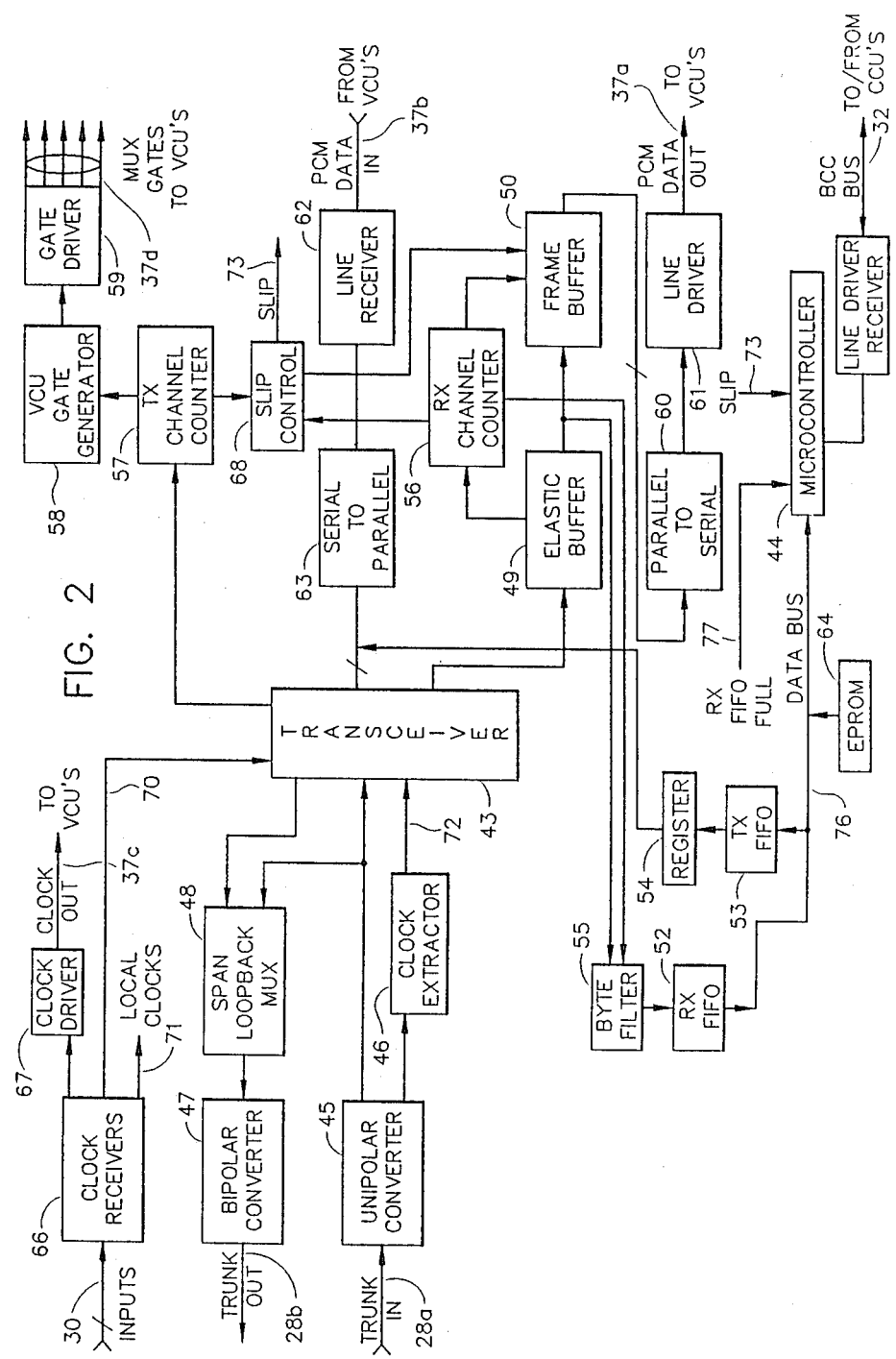
FIG. 2 is a block diagram of a MUX card included in the base station shown in FIG. 1.

A block diagram of a MUX card 19 is shown in FIG. 2. The MUX card 19 includes a transceiver 43, a microcontroller 4, a unipolar converter 45, a clock extractor 46, a bipolar converter 47, a span loopback MUX 48, an elastic buffer 49, a frame buffer 50, a receiver (RX) first-in-first-out FIFO stack 52, a transmit (TX) FIFO stack 53, a register 54, a byte filter 55, an RX channel counter 56, a TX channel counter 57, a VCU gate generator 58, a gate driver 59, a parallel-to-serial converter 60, a line driver 61, a line receiver 62, a serial-to-parallel converter 63, an electrically programmable read only memory (EPROM) 64, clock receivers 66, a clock driver 67, and a slip control unit 68.

Four major interfaces are provided to each MUX card 19.

The trunk 28 provides a 1.544 Mbps bi-directional path for all data between the COT 10 and the RRT 11.

Voice codec units (VCUs) in the channel modules 20 are interfaced with each mux card 19 by digital information data channels 37a, 37b, which provide a serial 1.544 MBPS bit data stream, and by clock line 37c and gate lines 37d, which provide appropriate clock and gate signals to allow the VCUs to extract and insert 64 KBPS/channel digital information in the correct time slot. Up to six VCUs can be supported by this interface.

The BCC bus 32 provides the control and status data between all of the channel modules 20 and MUX cards 19 in the RRT 11. The protocol used on the BCC bus 32 is SDLC multidrop with a polling of all secondary MUX cards 19 and all channel modules 20 by a single primary microcontroller 44 in the primary MUX card 19. A redundant BCC bus (not shown) may be provided as a backup.

Clock signals are received on lines 30 from the master timing unit 18.

The electrical interface to the T1 span trunks 28a, 28b provides those functions required to generate or receive a DS1 waveform. The interface is designed to meet the interconnection specifications for a signal appearing at a DSX-1 cross-connect (ref. AT&T Compatibility Bulletin #119). This specification allows up to 655 feet of ABAM (or equivalent) cable to connect the RRT 11 to the apprporiate transmission equipment or to the COT 10 directly.

In the receive path 28a, the unipolar converter 45 converts a bipolar alternate mark inversion (AMI) RZ signal to a unipolar TTL NRZ signal for input to the transceiver 43. The clock extractor 46 extracts a clock from the input signal which is used to clock the NRZ data and can optionally be used as a reference clock for an external phase locked loop (PLL) which would generate the 1.544 MHz input clock. The extracted clock signal is provided on line 72.

In the transmit path the bipolar converter 47 converts the TTL NRZ signal into a DS1 bipolar/AMI signal. The span loopback MUX 48 is provided to loop back the complete DS1 signal.

The transceiver 43 contains the appropriate circuitry for synchronization, channel monitoring and signalling insertion and extraction. The transceiver 43 is preferably a Model R8070 T-1 transceiver available from Rockwell International Corp. of Pittsburgh, Pa., USA.

The transceiver is preferably a multipurpose device and as such it supports various North American and European primary-rate digital protocols. The mode which is compatible with the concentrator 13 is the "193S". This mode provides 193 bits-frame, with A,B signalling; 12 frames per superframe; and zero suppression using B7 (2nd LSB) stuffing. The DS1 frame organization provides a sampling frequency of 8000 Hz.; an output bit rate of 1.544 Mbits per second; 193 bits per frame; and 24 time slots per frame. Signaling is provided by the eight bit of every sixth frame, the S-bit being time shared between terminal framing and signalling framing.

The transceiver 43 used herein provides independent transmit and receive sections, allowing each section to operate with different clocks and framing. A 1.544 MHz clock generated by and received from the MTU 18 by the clock receivers 66, via lines 30, is coupled to the transceiver 43 via line 70 and used as the transmit clock. The 1.544 clock received by the clock receivers 66 is also coupled to the VCUs on line 37c by the clock driver 67. The receive path of the transceiver 43 uses the extracted clock signal on line 72 from the clock extractor 46 up to the elastic buffer 49. After this point, a local clock provided by the clock receivers 66 on line 71 is used.

The concentrator 13 in the COT 10 is programmed to derive its tramsit bit timing from the received DS1 signal (loop timed). This in effect makes the DS1 input and output bit rate identical.

A 80 MHz OCCO in the MTU 18 is used as the primary clock from which all other timing is derived including the 1.544 MHz local clock.

The subscriber stations 41 lock their local VCXO's onto the UHF RF signal transmitted by the base station and therefore generate local timing which is directly related to the base station timing. This results in a completely synchronous system so that the digital information rate generated by the subscriber stations 41 exactly equals the data rate provided by the T1 trunk 28. In this configuration, data is not accumulated or depleted over time so controlled slips are not required.

In a MUX-souces timing mode of operation, the COT 10 is slaved to extracted DS1 receive timing; the DS1 transmit path 28b is referenced to the MTU OCXO; the DS1 receive path 28a is referenced to the MTU OCXO (via loop timing); the VCU-PCM interface 37 is referenced to the MTU OCXO; and the VCU is referenced to the MTU OCXO. In this mode the total system is synchronized, and no controlled slipping has to be done.

Although the transmit and receive DS1 rates are equal on the average due to the slaving of one direction to the other, jitter can occur in the received waveform which can make this signal look instantaneously like a higher or lower rate. Also, due to the unknown path delay and unknown delay in the concentrator 13, the local clock and regenerated receive clock have an unknown skew between them. To compensate for these two effects, a 16-byte elastic buffer 49 is connected to the transceiver 43. Bytes are loaded into this buffer 49 at a rate determined by the extracted receive clock signal on line 72. Data is extracted at a rate determined by the local clock signal on line 71. The elastic buffer 49 is coupled to the RX FIFO 52 stack by the byte filter 55 so that independent shift-in and shift-out clocks can be provided.

If the transceiver 43 loses frame alignment, data loading into the elastic buffer 49 is inhibited to prevent invalid data from being sent to the VCUs and the microcontroller 44. During out-of-frame conditions, data is still sent to the VCUs, but this data is forced to FF(HEX), which corresponds to an analog "zero" level. Once frame alignment has been re-established, data is again loaded.

The frame buffer 50 is provided to allow the DS1 transmit and receive paths 28b, 28a to operate independently. Due to such independence, transmit and receive frames are not necessarily in alignment. However, the interface 37 to the VCU is designed such that for a given channel, the transmit and received data is sent simultaneously, implying frame alignment from the VCU's perspective. The frame buffer 50 resolves this dilemma by providing separate read and write pointers which allow the writing of data into the frame buffer 50 to be based on the transceiver receive frame alignment and the reading of data to be based on the transmit framing. The transmit framing is used on the VCU interface 37 thus allowing the transmit and receive byte for a given channel to occur simultaneously on the VCU interface 37.

The frame buffer 50 contains four frames worth of data. The addressing is such that a fixed address within each of the four buffers corresponds to a fixed channel assignment. The read and write pointers are initially set two buffers apart. Once RX framing is acquired, the write pointer follows the RX framing which means that it may point at a different byte (i.e. channel) in its current buffer than the read pointer. Having a two-buffer initial separation ensures that the pointers will initially never be closer than 1 frame (e.g Read at the end of frame 1, and Write at the beginning of frame 3). This separation allows a large amount of jitter to occur on the receive data without the write pointer crossing the read pointer. It also simplifies the slipping function which is explained below.

Reads and writes of the frame buffer 50 are slaved to the transmit clock. Only one read of the frame buffer 50 is performed every eight bit times of the transmit clock since the VCU interface 37 is under control of this clock. However, the receive path is under control of the extracted clock signal on line 72 up to the elastic buffer 49. To guarantee that data does not build up in the elastic buffer 49, the frame buffer 50 control logic allows up to two writes to be performed during the same eight bit times of the transmit clock.

A secondary function of the frame buffer 50 is that it allows controlled slips to be performed in the receive direction. Under normal conditions, this should never occur when operating with the concentrator 13, as explained previously; and is therefore considered a fault condition. If the timing of the concentrator 13 drifts (loses lock) or if the DS1 input on input trunk 28a is lost, the data rate into the frame buffer 50 could possibly change. If this condition lasts for sufficient time such that the read and write pointers overlap, then a controlled slip is performed. The slip moves the appropriate pointer such that one frame of data is either repeated or deleted. When this occurs, receive framing will not be lost if the DS1 input is still present. To simplify the comparing of the pointers, this function is only active during the Terminal Count (TC) of either pointer. Terminal Count is defined as the end of the current buffer. The slip control unit 68 keeps track of the number of TCs reached by both the read pointer and the write pointer in response to TCs provided by the RX channel counter 56 and the TX channel counter 57. If the read pointer passes the write pointer than a frame of data will be repeated. If the writer pointer passes the read, then a frame of data will be deleted. The indication of a slip is latched by the slip control unit 68 and provided on line 74 to the microcontroller 44.

The microcontroller 44 is interfaced with the transceiver 43 by a data bus 76 and two 16-byte FIFO stacks 52, 53, which provide a buffer for both transmit and receive BCC data. BCC data is extracted from the RX FIFO stack 52 during the first DS1 time slot; and BCC data is inserted into the TX FIFO stack 53 during the first DS1 time slot. Transmit BCC data is inserted if commanded by the microcontroller 44 by the setting of a control bit.

The RX FIFO stack 52 buffers messages from the RPU 14 that have been transmitted over the T1 trunk 28 to the MUX card 19 that is the primary controller of the BCC bus 32. The format of the message bytes is such that bit 3 is designated as a sequence bit. This bit normally toggles on every byte transmitted by the RPU 14. One channel on the T1 trunk 28 can carry 64 KBPS (56 KBPS usable) however the RPU 14 can not supply data at this rate. The sequence bit allows the MUX card 19 hardware to discard those bytes sent which are simply a repeat of the previous byte. Repetition occurs whenever the data buffer written by the RPU 14 becomes depleted. Repetition has no effect since the byte filter 55 placed before the receive FIFO stack 52 eliminates those bytes which have the same sequence bit.

The RX FIFO "output ready" status, which is readable by the microcontroller 44, indicates that at least one byte is in the RX FIFO stack 52. To prevent an RX FIFO overflow condition from occurring, an "RX FIFO FULL" signal is generated and provided on line 77 to interrupt 0 of the microcontroller 44. The microcontroller 44 then has one frame time (125 $\mu$sec) to read at least one byte from the RX FIFO stack 52 before an overflow occurs. Since the RX FIFO stack 52 is 16 bytes deep, it takes a minimum of $16 \times 125$ $\mu$sec=2 msec to fill an empty RX FIFO stack 52.

The TX FIFO stack 53 provides a buffer for the MUX card-to-RPU BCC channel communication. The register 54 extracts data from the TX FIFO stack 53 and inserts it into the first DS1 channel 1 when enabled by the microcontroller. The TX FIFO stack 53 status is readable but does not generate any interrupts. Like the receive path, the alternating sequence bits allow the TX FIFO stack 53 to empty even in the middle of a message without causing any errors. When empty, the TX FIFO stack 53 simply repeats the last byte and this repetition of data will be discarded by the interface to the RPU 14 because the sequence bit will be unchanged. This repetition feature is also useful for sending idle patterns (if used). The microcontroller 44 only has to load the idle pattern once into the TX FIFO stack 53 and it wil be repeated until another byte is loaded.

The VCU Interface 37 provides the path for digital information to and from the VCU. The data is sent serially at the same rate as the DS1 data, namely 1.544 MBPS. Each VCU sends and receives data for four contiguous slots of the DS1 frame. The four bytes transmitted and the four bytes received occur simultaneously. In order for a VCU to identify its four time slots, a GATE is provided on line 37d by the MUX card 19. This gate lasts for four bytes and a separate gate is generated for each VCU. Each particular signal (e.g. GACLAIMSTE1, GATE2, etc.) is hardwired to a particular VCU. Each VCU contains four voice codec processors. Each VCU multiplexes the four voice codec processors in response to its respective gate signal.

All four bytes from one VCU will follow one another contiguously. Each byte will be converted to parallel by the serial-to-parallel converter 63 and then input to the transceiver 43. This process continues normally for most channel time slots. However, when the transceiver 43 is transmitting the twenty-fourth channel of data, it extends the cycle by one clock to account for the frame bit time. It is desired that this extended time slot occur at the end of a gate because a VCU expects its four bytes to be contiguous and can not account for a gap in the transmit timing. Moving the gap to the end of a VCU cycle allows the gap to occur between GATEs and therefore has no effect. Due to pipelining and synchronous delays, when the Model R8070 transceiver 43 is transmitting the twenty-fourth channel of data, the second channel of data is active on the VCU interface 37.

The GATE signals 37d actually lead the data slightly to allow the VCU 24 to initialize its interface logic.

All of the VCUs share a common serial return data bus 37b. Drivers for each VCU are tri-stated when not selected by the gate. Therefore only one VCU drives the bus 37b at any one time. In some installations, less than six VCUs may actually be connected to a MUX card 19. To define the serial data when no VCU is driving the VCU return data bus 37b, pull up and pull down resistors are provided on the MUX card line receiver 62, which will define the data to be all ones.

The microcontroller 44 performs various functions on the MUX card. It is responsible for initializing all hardware as well as monitoring status and errors. Also, the microcontroller 44 on one the MUX cards 19 is selected by the RPU 14 as the primary controller for controlling the BCC bus 32. The MUX card 19 containing the primary controller is considered to be the primary MUX card 19. Control of the BCC bus 32 involves the continual polling of all channel modules 20 (via their CCUs) and all other MUX cards 19 which are treated as secondary MUX cards. The secondary MUX cards still perform the other functions described above for their respective channel modules 20.

The microcontroller 44 is preferably a Model 8344 microcontroller available from Intel Corporation of Santa Clara, Calif., USA. The microcontroller 44 includes a built-in serial interface unit (SIU) which supports the SDLC protocol. The microcontroller 44 contains communication hardware to help free up the microcontroller procesor core from having to interact with every event that happens on the BCC bus. The SIU interrupts the processor core only when a message has been transmitted or received.

All program memory resides externally in the EPROM 64. Data memory consists of 4K bytes externally and 192 bytes of internal RAM. A watchdog timer (not shown) is provided to reset the microcontroller 44 if an abnormal event occurs which prevents the microcontroller 44 from normal operation. The occurrence of a watchdog reset will be latched and thus allow the microprocessor 44 software to verify the occurrence of that event.

The MUX card 19 which is designated primary by the RPU 14 is responsible for controlling the MTU 18 and reporting its status to the RPU 14. Such controls consists of four lines which are mapped into four bits of a register (not shown). The outputs of the register are connected to tri-state drivers (not shown). All MUX cards are wired to four pairs of common lines but only one set of drivers are enabled at a given time. All timing of these signals is under software control.

Each MUX card 19 can perform a hardware reset of a channel module 20. This would normally be commanded by the RPU 14 if a channel module 20 goes into an undefined state.

The concentrator 13 and the RPU 14 are coupled via a 64 Kbit/sec DS0 channel, which is referred to as the data link 80, 81. The DS0 interface at the RPU 14 is supported by a DS0/DP circuit card in the concentrator 13 and the concentrator/RPU interface unit 15.

The RPU 14 controls the assigning of time slot connections, and must maintain communications with the concentrator 13 over the data links 80, 81 in order to provide a path to receive connection requests and to send connection assignments. The data link 80, 81 are also used to transfer status, test and alarm messages between the RPU 14 and the concentrator 13.

The BCC channel is used by the RPU 14 to control and configure the RRT 11 hardware to monitor status and to transmit and receive call processing information.

The digital span trunks 28 between the COT 10 and the RRT 11 are 1.544 MB T1 compatible. The signalling format and electrical characteristics are defined by AT&T Technical Advisory No. 32, "The D3 Channel Bank Compatability Specification - Issue 3, October, 1977".

The electrical interface of the digital data ports of the Model 1218C concentrator 13 is defined by ITT document 628340-001-301 "Performance Specification, DS0 Dataport (DS0/DP)".

During system initialization and whenever the data link 80, 81 is lost, the RPU 14 and the concentrator 13 execute a data link assignment, algorithm to (re)establish the link. The data link 80, 81 is considered lost if no message is transferred during a 200 msec period, or if either the concentrator 13 or the RPU 14 sends an abandon (ABN) control character over the data links 80, 81. The data links 80, 81 are assigned to one of two line group and line circuit combinations of the concentrator 13. A verification procedure establishes that the new data link is found. If the data link is not (re)established within two seconds, both the concentrator 13 and the RPU drop all traffic and restart the algorithm. The algorithm is initiated by the RPU 14, which sends a PDL control character on each of the two channels of the data link 80. The scans these two channels for a character, and responds by sending the PDL character back over the first channel the character was detected on. The RPU 14 responds with an ACK signal, and the standard acknowledgement sequence is initiated by the control unit of the concentrator.

Data is transferred over the BCC channel 35 lines in the form of serial, synchronous (8 bit) byte information. The sampling frequency for information transfer is 8 KHz.

The RPU 14 contains a software-implemented message processing module (MPM) (not shown), which performs high-level call processing functions between the concentrator 13 and the subscriber stations 41. The MPM is responsible for call processing functions such as handling of incoming calls from the concentrator 13 and call requests from the subscriber stations 41, and the resulting allocation of voice channels. The MPM is responsible for processing status and error messages received from the CCUs 23, the MUX cards 19, the concentrator 13 and the subscriber stations. Some operator commands involving the CCUs 23, the MUX cards 19 and the subscriber stations are also passed on to the MPM for handling. Finally, the MPM performs the initialization of the system configuration (the T1 span trunks 28, the MUX cards 19, and the CCUs 23), along with any necessary background recovery and maintenance of the configuration.

With regards to the call processing functions, the MPM is organized as a state machine wherein the concentrator, RCC and BCC messages are tokens to the message processing state machines. The MPM processes the tokens by updating the database, sending the necessary message responses, and then transitioning to the next state.

The MPM uses system mailboxes, which are maintained by a softwareimplemented scheduling module in the RPU 14, to receive and transmit messages to and from other RPU modules. The MPM receives and transmits messages to and from external sources indirectly via modules which interface with the external equipment.

Also, the MPM utilizes subroutines in a database module in the RPU 14 to retrieve or update state information in the database.

The MPM is responsible for initializing and maintaining the system configuration. This involves establishing and maintaining the primary MUX card so that communication with the RRT 11 is possible, initializing secondary MUX cards based on the DS1 span status of the T1 span trunks 28, initializing the CCUs 23 based on the configuration given by the operator, and making sure that a the RCC is assigned whenever possible.

When the MPM performs initialization for the first time, it attempts to find which T1 trunks 28, MUX cards 19 and the CCUs 23 are present in the system, and selects one of the MUX cards 19 as the primary MUX card in accordance with the following predetermined selection routine.

Initialization can begin only after the concentrator 13 has informed the MPM of the status of each T1 span trunk 28, at which time the MPM updates the database appropriately. The MPM must know which T1 span trunks exist to determine which MUX cards 19 are to be initialized, and consequently which MUX card is to be assigned as the primary MUX card. Only when all T1 span trunk status is known and at least one T1 span trunk 28 is up, does initialization proceed.

The MPM establishes a connection with the MUX card corresponding to each T1 span trunk 28 that is up, by assigning a trunk connection via a DS0/DP card using the first DS0 channel of the span trunk 28. Each MUX card is sent a hard-reset command over this channel, and the trunk 28 is deassigned. After waiting for the MUX card 19 hard-resets to be completed, connections are again established with the MUX cards 19 one at a time, and each MUX card 19 is assigned as a primary. This primary MUX card assignment is required since a MUX card 19 can communicate via the BCC link over the T1 span trunk 28 only when it is in the primary state.

If the MUX card indicates that it has successfully become primary MUX card and it is reporting the correct MUX card station address (which must correspond to the DS1 span number), it is placed in the polling configuration and marked as "ready" in the database. The MUX card 19 is then set back to secondary, and the trunk 28 is deassigned. Once all MUX cards 19 have been initialized in this way, one is selected to become the primary MUX card. If more than one MUX card has been found, the primary MUX card is sent a polling configuration containing all the MUX cards in the configuration. The primary MUX card is responsible for performing the keep-alive protocol at the RRT 11 and informs the MPM whenever a polling error occurs. If no valid data has been received during this initialization procedure, the entire procedure is repeated using the redundant DS0/DP channel.

Once the MUX cards 19 have been initialized, the CCUs 23 corresponding to the MUX cards in the configuration are initialized. The number of CCU's defined in the system is determined by operator input, and the MPM will attempt to initialize only as many as are defined. First, for every MUx card in the polling configuration, the MPM commands all the associated CCUs 23 until they establish a station address on the BCC bus 32, the MPM must perform station address initialization (STAD INIT), which is described below.

If a CCU 23 is successfully initialized, it is placed in the polling configuration, and a timer is set to check that an event is received from that CCU 23. Once the MPM has reached the number of CCUs 23 defined, or has attempted to initialize all CCUs 23 corresponding to the MUX cards 19 that are in the configuration, a polling configuration message is sent to the primary MUX card for the initialized CCUs 23. Once this initialization is complete, the background process periodically attempts to find any missing CCUs 23 by the STAD INIT process.

When a CCU 23 is first polled by the primary MUX card, it responds with a Baseband Event message indicating any failures, its ready status, and the frequency it is set to. At this time the MPM marks the CCU as "ready" in the database if appropriate. The frequency is stored, each CCU channel is set to idle, and each corresponding DS0 channel is set to available. If the database indicates that the modem is not set at maximum power, a message is sent to the CCU to set the attenuation level of the modem.

If the MPM has failed to establish a primary MUX card, a timer is set to reattempt initialization later. This first-time initialization procedure is executed periodically until the first primary MUX card is established, after which time the recovery procedure is used whenever the Primary MUX card fails.

Primary MUX card recovery is handled differently from the first time initialization, since the MPM already has inforamtion about which MUX cards 19 and CCUs 23 exist in the configuration, and it is critical to recover quickly so as not to lose voice calls. When a primary MUX card failure occurs, the primary MUX card and all its associated CCUs 23 are removed from the polling configuration. During recovery, the MPM attempts to assign a new primary MUX car connected to each T1 span trunk 28 that is up, provided no voice call is assigned on the first DS0 channel of that trunk. On the first attempt, the last primary MUX card is avoided. If the MPM fails to initialize a primary MUX card and no valid data has been received during this procedure, the entire procedure is repeated using the redundant DS0/DP channel. If there is still no Primary MUx card, and there is a DS1 span with a voice call on the first DS0 channel, the voice call is torn down and initialization is attempted. If the MPM still fails to initialize a primary MUX card, a timer is set to retry later.

If a new primary MUX card is successfully assigned, a polling configuration with the old primary MUX card and associated CCUs that were removed is sent to the new primary MUX card. An RCC is assigned if there currently isn't one; and each of the CCUs that were removed from the configuration are sent a reset command to clear out any outstanding voice calls or RCC assignment. If a call was torn down in the MPM database in order to assign the BCC channel, the CCU is informed of the disconnection.

It is assumed that if no messages are received from the CCUs, all ongoing voice calls are still in progress. While a CCU is not being polled, it queues up any new messages, which are then transmitted after polling resumes. If the queues overflow, the CCU informs the MPM of this once the primary MUX card resumes polling, causing the MPM to query each channel of the CCU to determine the current status.

An MPM background process is used to maintain and recover the system configuration. This includes (1) initializing secondary MUX cards whenever the corresponding T1 Span is up but the MUX card is not in the polling configuration; (2) initializing the CCUs if the number of CCUs in the polling configuration is less than what the operator has defined; (3) recovering DS0 channels that have failed; and (4) keeping the concentrator informed of which line groups are in the configuration. The first three background tasks are performed only when there is a primary MUX card defined in the system, since they involve communication with the RRT 11.

Since the MPM cannot communicate with the CCUs 23 until they establish a station address on the BCC bus, the MPM must perform station address initialization. Such initialization is performed by the MPM placing one of the DS0 channels corresponding to the CCU into loopback. Since each VCU associated with an uninitialized CCU is continuously transmitting a unique pattern over the T1 trunk while idle, the VCU will detect the pattern on the forward channel during loopback and inform the CCU. After putting the channel into loopback, the MPM sends a STAD INIT message containing the appropriate station address to the primary MUX card, which broadcasts it to all of the CCUs. Only uninitialized CCUs will respond to this message. The CCU that has detected the pattern takes that address for its own.

If the primary MUX card responds with a failure message, the MPM attempts initialization of that CCU on each of the available slots. Note that the slot corresponding to the BCC channel is not available, since the DS0 channel used for the BCC channel cannot be put into loopback while being used for remote communication. Also, in some concentrators, because of a design nuance, a DS0 channel cannot be put into loopback more than once in a row without putting another into loopback first, so if necessary the MPM skips the first slot in the initialization sequence to avoid this problem.

If the CCU 23 is successfully initialized, it is placed in the polling configuration, and the primary MUX card is sent the new configuration. A timer is set to check that an event is received from that CCU.

When a CCU 23 is first polled by the primary MUX card, it responds with a Baseband Event message indicating any failures, its ready status, and the frequency it is set to. At this time the MPM marks the CCU as "ready" in the database if appropriate. The frequency is stored, each CCU channel is set to idle, and each corresponding DS0 channel is set to available. If the database indicates that the modem is not set at maximum power, a message is sent to the CCU to set the attenuation level of the modem.

At this point, the initialization of the CCU 23 is complete, and the CCU is ready to accept voice and RCC assignments.

When the MPM commands the concentrator 13 to assign a trunk, the concentrator initiates a pre-connection test. If this test fails either at the concentrator 13 or at the CCU 23, the MPM is informed and sets the DS0 channel as failed in the database. In the background, the MPM continually attempts to recover any failed DS0 channels.

When performing DS0 channel recovery, the MPM scans the database for a failed DS0 channel corresponding to a CCU 23 that is in the polling configuration and is idle on that slot. Due to the aforementioned design nuance, a DS0 channel cannot be placed into loopback more than once in a row without putting another channel into loopback first. Therefore if the selected channel cannot be put into loopback for this reason, the MPM searches for another failed DS0 channel if one exists, and performs recovery on the second one found. If no other failed channels exist, any idle channel is selected and put in and then out of loopback; and recovery of the failed DS0 channel can then be attempted. If no idle DS0 channels exist, the DS0 channel recovery is not attempted, and the MPM waits for the background process to put another channel into loopback either via station address initialization or secondary MUX card initialization.

If a failed DS0 channel has been selected, the MPM puts the channel into loopback and then sends a message to inform the corresponding CCU 23 that a DS0 channel test is being performed on a particular slot. If the CCU response is successful, the channel is marked as recovered in the database and loopback is removed. An alarm is triggered and cleared appropriately.

The MPM attempts to initialize a secondary MUX card whenever the corresponding T1 trunk is up but the MUX card is not in the polling configuration. An important factor in this initialization is to verify that the T1 span trunk 28 and the MUX card 19 are not crossed. In other words, the station address of the MUX card must match the T1 trunk number.

To initialize a secondary MUX card, the MPM puts the first DS0 channel of the T1 span trunk into loopback. While waiting to be initialized, the MUX card is continually transmitting a unique pattern over the reverse channel, and will detect when the pattern is received over the forward channel during loopback. Since the MUX card 19 only has read/write access on the first DS0 channel of the span trunk 28, this is the only channel that can be used for this initialization procedure. Also, if the concentrator has the aforementioned design nuance, a DS0 channel cannot be put into loopback more than once in a row without putting another channel into loopback first. So if necessary, the MPM puts the second DS0 channel of the T1 span trunk in and then out of loopback before starting the initialization procedure.

Once the first DS0 channel of the T1 span trunk is in loopback, the MPM sends a message indicating that secondary MUX card initialization is in progress, which is then broadcast to all secondary MUX cards by the primary MUX card. The MUX card that detects the pattern sends a successful response message to the MPM, and automatically performs a hard reset. Otherwise, if the MPM times out waiting for a response, or a failure message is received, the MUX card remains uninitialized in the database. In either case, loopback is removed.

If the response was successful, the MUX card address in the message is compared to the T1 span trunk number. If they do not match, the span trunks are crossed and the initialization fails.

If the MUX card address is correct, the MPM waits for the reset to be completed, and then sends a polling configuration message to the primary MUX card containing the new station address. A timer is set to wait for an event from the MUX card. When the secondary MUX card is first polled, it immediately queues an event message for the RPU, indicating its ready status and any errors that may have occurred. If the event message is received and does not indicate any errors, the MUX card is marked as "ready" in the database. If the event message is not received or indicates errors, the MUX card remains uninitialized and the initialization is reattempted later.

As previously described, the call processing in the MPM is organized using state machines. Input tokens, which force a call processing function to be performed, consist of messages from the subscriber stations 41, the concentrator 13 and the CCUs 23, as well as timeouts. The tokens are broken into two categories: channel tokens from the CCUs, and the RCC tokens from the concentrator and the subscriber stations. Timeout tokens are included in both categories, depending on which token type the MPM is waiting for when a timeout occurs. The channel tokens and RCC tokens are used to index into one of two state machines, the channel state machine and RCC state machine respectively.

The MPM must determine the type of token received, and the identity of the subscriber station or channel that is affected by the token. The token type is used to determine whether the channel state transition table or the RCC state transition table is to be used. The MPM then looks up the action to be taken in the appropriate state transition table, using the token and the current state of the subscriber station or channel as input. The MPM processes the token by executing the function indicated by the table entry. The processing involves updating the necessary status in the database, generating the proper message responses and transitioning to the next RCC and/or channel state.

Figure 3:
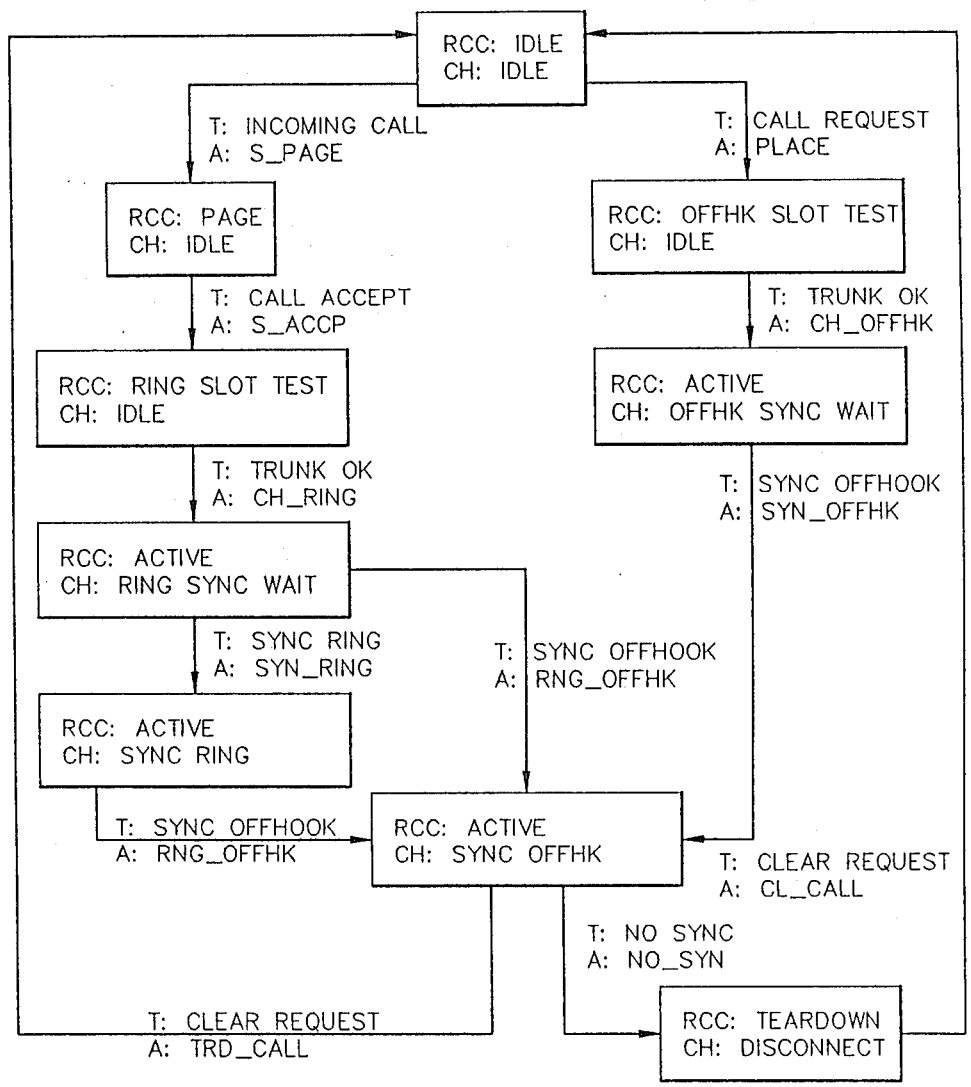
FIG. 3 is a diagram showing the normal call processing logic flow ordered by the RPU in the base station of FIG. 1.

The normal call processing logic flow is shown in FIG. 3. The most common RCC and channel state combinations are listed, as well as the input token (T) and resulting action (A) required to transition from one state to another.

Initially, all subscriber stations 41 are in the RCC Idle state and all available channels are in the Channel Idle state, which indicates that no connections are set up or in progress.

The changes of state for a typical call termination are as follows. An Incoming Call message is received from the concentrator 13, which includes the Subscriber Index (SIDX) of the destination subscriber station. The SIDX is used by the concentrator to uniquely identify a subscriber, and is a function of the line group and the line circuit initiating the call. This number is used to map to a subscriber station in the database. A Page message is sent out to the subscriber station having this SIDX, and the state of the subscriber station 41 is set to Page. When a Call Accept message is received from the subscriber station, a channel is assigned for this connection. The channel uniquely specifies a DS0 channel on a T1 span trunk 28, as well as a CCU/slot combination at the RRT 11. The concentrator 13 is commanded to assign the specified trunk to the subscriber station 41, and then initiates a preconnection test on the specified DS0 channel. The subscriber station 41 is set to the Ring Slot Test state, waiting for an acknowledgement from the concentrator 13. When the ACK message is received, the state of the subscriber station 41 is set to Active. At this point, the CCU 23 and the subscriber station 41 are informed of the channel assignment, and the channel is placed into the Ring Sync Wait state. When the CCU 23 indicates that synchronization has been acquired, the channel state is set to Sync Ring. Finally, when the CCU 23 indicates that the subscriber station 41 has gone offhook, the channel is set to the Sync Offhook state. The Sync Offhook state indicates that a voice connection is established.

A call origination begins with a Call Request message being received from the originating subscriber station 41. A channel is assigned for this connection, and the MPM commands the concentrator 13 to assign the specified trunk to the subscriber station 41. The subscriber station is set to the Offhook Slot Test state while waiting for the concentrator to complete the preconnection test on the indicated DS0 channel and respond with an acknowledgement. When the ACK message is received, the state of the subscriber station is set to Active. At this point, the CCU 23 and the subscriber station 41 are informed of the channel assignment. The channel state is set to Offhook Sync Wait until the channel gains synchronization. The base station CCU informs the MPM when it detects the transmission from the originating subscriber station 41. This causes the MPM to change the state of the channel to the Sync Offhook state, indicating that a voice connection is established.

When the MPM sets up a voice call, whether is is a terminating call or an originating call, the concentrator 13 must assign a trunk 28 to the appropriate line group and line circuit. Commanding a trunk assignment causes the concentrator 13 to initiate a preconnection test. From the concentrator perspective, a preconnection test involves sending a 55H pattern on the specified forward DS0 channel, and checking for the 55H pattern on the reverse channel. If the pattern is received, the concentrator considers the preconnection test successful. At the CCU 23, each idle VCU is continually transmitting the preconnection pattern and also scans the incoming channel for the pattern. If a voice call is set up on that VCU within a certain window after the pattern is detected, the preconnection test is considered successful.

A normal disconnection begins when the subscriber station 41 goes onhook (an external phone going onhook is not detected). This causes the subscriber station to send a message indicating to the MPM that the call should be cleared. The MPM informs the CCU 23 and the concentrator 13 that the call is being torn down, and the subscriber station and channel states are set to idle. In the case when a CCU detects a fade on the channel, the CCU sends a message indicating that synchronization is lost. This causes the MPM to set the subscriber station and channel states to Teardown and Disconnect respectively, until a message is received from the subscriber station or a time-outs counter expires indicating that the call should be cleared. Once this message is received, the channel and subscriber station states are placed back to idle, and the concentrator 13 and the CCU 23 are informed that the call has been torn down.

One of the RF channels between the channel modules 20 and the subscriber stations 41 is allocated as the RCC in accordance with a predetermined allocation routine.

After the first event is received from one of the CCU's indicating that it is ready, the MPM assigns that CCU as the CCU for the RCC. After an event is received acknowledging the assignment, the RCC is established and communication with the subscriber stations 41 can begin. The MPM will always attempt to establish the RCC on the channel corresponding to the BCC channel of the T1 span trunks 28 first, since this slot of the CCU cannot be used for voice calls.

There should be an RCC assigned whenever possible, since no voice calls can be established without this link to the subscriber stations. An RCC assignment is attempted when the following occurs: (1) a CCU completes initialization and there is no RCC; (2) the primary MUX card is recovered and there is no RCC; (3) the CCU that was assigned as the RCC goes down; (4) the MUX card containing the CCU for the RCC goes down; (5) a channel response message is received from the CCU for the RCC indicating that the CCU is in a voice mode instead of a control mode; (6) the MPM times out waiting for the event acknowledging an RCC assignment; (7) the MPM times out waiting for an RCC message acknowlegement; (8) a CCU completes training and there is no RCC; or (9) the maintenance mode is disabled while a CCU is still in the configuration, and there is no RCC.

The MPM assigns an RCC only to a CCU that is already initialized, and the RCC can only be assigned on the first slot of the CCU. The MPM will always attempt to establish the RCC on the channel corresponding to the BCC channel first, since this slot of the CCU cannot be used for voice calls. If this slot is not available, the MPM steps through all CCUs in the configuration. If none of the CCUs have the first slot available, a voice call is torn down to allow for an RCC assignment.

Once a command is sent to assign a CCU as the RCC, an event is expected from the CCU indicating that the assignment was successful. If no event is received, the MPM will reassign the RCC elsewhere. Once the RCC is established, messages can be transmitted and received from the subscriber stations. There can be only one outstanding RCC message in the forward channel, and the MPM sends the next one only after an RCC Ack message is received. If an RCC Ack timeout occurs, the RCC is reassigned.

The concentrator/RPU interface unit 15 interfaces the concentrator with an Alcyon computer of the RPU 14. The interface unit 15 reconciles the differences between the voltage levels, rate, and protocols expected by these different systems. The concentrator/RPU interface unit 15 handles the voltage conversion, rate conversion with the requisite data buffering and protocol interaction that is required to allow communication between the concentrator 13 and the RPU 14.

Figure 4A:
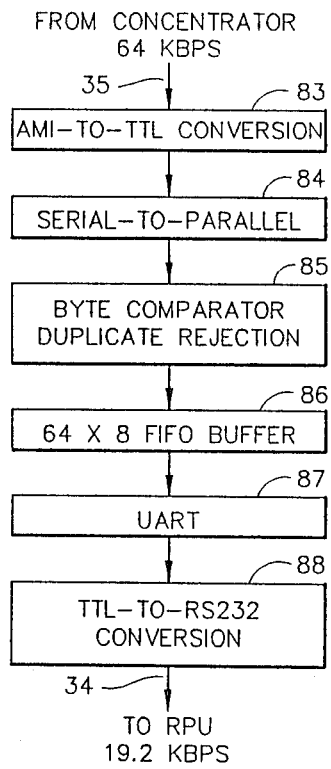
FIG. 4 is a functional block diagram of the exchange/RPU interface unit in the base station of FIG. 1.
Figure 4B:
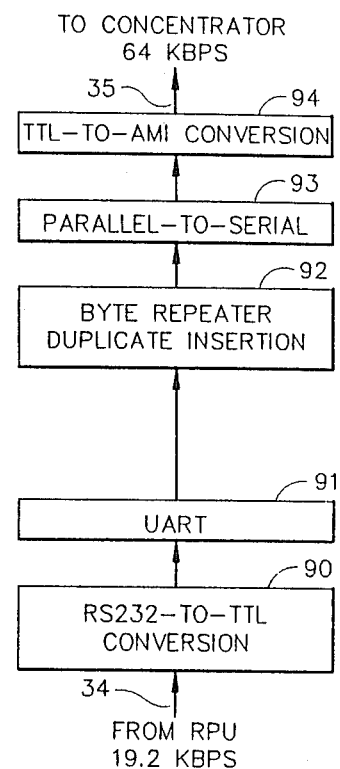

FIGS. 4A and 4B show the functions of the concentrator/RPU interface unit 15. In the signal path from the concentrator 13 to the RPU 14 (FIG. 4A), the concentrator/RPU interface unit processes 64 kbps data through an AMI-to-TTL conversion unit 83, a serial-to-parallel converter 84, a byte comparator duplicate rejection unit 85, a 64×8 FIFO buffer 86, a UART 87 and a TTL-to-RS232 conversion unit 88. In the signal path from the RPU 14 to the concentrator 13 (FIG. 4B), the concentrator/RPU interface unit 15 processes 19.2 kbps data through an RS232-to-TTL conversion unit 90, a UART 91, a byte repeater duplicate insertion unit 92, a parallel-to-serial converter 93 and a TTL-to-AMI conversion unit 94.

The concentrator 13 communicates with the interface unit 15 over a synchronous 64 kbps bipolar DS0 channel 35 in accordance with a protocol that requires the repetition of the last byte transmitted when the channel is idle. This guarantees constant activity over the bipolar channel, and helps keep the communication synchronous. The bipolar signal is alternate mark inverted (AMI), meaning that each one in the data string must send one pulse of opposite polarity to that transmitted by the previous one. Zeroes cause no activity on the line, so the signal is composed of positive, negative, and zero voltages (a ternary level signal).

The Alcyon computer of the RPU 14 communicates with the interface unit 15 over an asynchronous, 19.2 kbps RS232 link. This is the standard format used in computer communications, and involves a −12 volt idle channel with bursts of +12 volt bits to convey the bits of information. The RS232 format requires the insertion of start and stop bits to denote byte boundaries.

Since the two protocols require different rates of communication, the data from the higher rate, 64 kpbs bipolar channel must be buffered down to the lower rate, 19.2 kpbs RS232 link. The buffer 86 contains at least one entire message. The byte comparator duplicate rejection unit 85 detects and rejects the retransmitted bytes. This requires parallelization of the data by the serial-to-parallel converter 84 to enable detection of duplicates, and then reserialization by the UART 87 to transmit this data over the RS232 link.

The alternative mark inversion (AMI) signalling must be transfomer coupled to properly isolate and terminate the channel from the Model 1218 concentrator. A pulse transformer is used to support data rates as low as 64 kbps, and the signal that is produced on the board is converted to TTL levels. The AMI signal is +/−2 volts unterminated, and can be used to turn on transistors when a one is being transmitted. This serial data must be parallelized using the byte boundary information contained in the AMI clock signal, and then duplicate bytes must be rejected. Original bytes must be buffered and transmitted over the RS232 link.

The RS232 protocol, including start and stop bits, is easily implemented by using an industry standard universal asynchronous receiver transmitter (UART) 87. The UART 87 is loaded with a byte to be sent, adds the start and stop bits and serializes the data. This TTL signal must be converted to RS232 voltages, and then the signal can be sent to the computer in the RPU 15.

The data flows in an identical fashion in the other direction, as shown in FIG. 4B, with the exception that the UART 91 converts the data from serial to parallel, the data is not buffered from the low-rate to the high rate, and the last byte sent is repeated by the byte repeater duplicate insertion unit 92 when there is no more information to be send.

Figure 5:
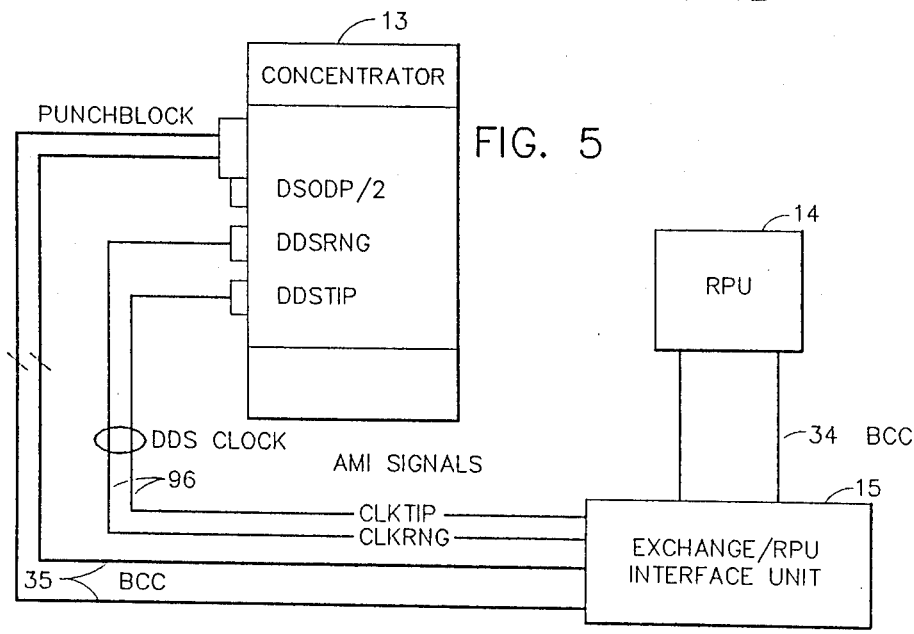
FIG. 5 is a block diagram showing further detail of the connections of the exchange and the RPU to the exchange/RPU interface unit in the base station of FIG. 1.

The interconnections between the concentrator 13, the interface unit 15 and the RPU 14 are shown in FIG. 5.

The signals from the concentrator 13 are terminated in a punchblock 95, from which the lines 35 are connected to the interface unit 15. The clock lines 96, which are connected betwen the DS0/DP2 card of the concentrator and terminate on two wire-wrap pins on the backplane of the rack of the interface unit 14. These contain bipolar violations to signify byte boundaries, must also be brought to the interface unit 15 to allow synchronization.

The Alcyon computer of the RPU 14 has a number of different channels that communicate over RS232 links.

There is a BCC protocol for providing the communications format for sending digital messages between the RPU 14, the MUX cards 19 and the CCUs 23.

BCC messages are variable length, and always contain addressing information and a command code. The RPU 14, CCUs 23 and MUX cards 19 can all generate messages as well as receive them. The messages are used for control purposes, for reporting status, and for handling call processing information.

BCC message traffic occurs over several physical links, requiring two unique protocols. If a message path consists of more than one physical link, the appropriate protocol conversion is performed and the message is relayed to its destination.

The BCC protocol involves two physical transmission links, a BCC channel of a T1 span trunk 28 and the BCC bus 32.

The BCC bus 32, is an SDLC multi-drop line. The BCC bus 32 is used for communication between the MUX cards 19 and the CCUs 23. One of the MUX cards 19 is designated as the primary MUX card. All other MUX cards and all CCU's communicate with each other only via the primary MUX card.

A BCC message path can include either one or two hops over distinct physical links. If two hops are involved, the message is repackaged by converting the protocols as required, leaving the BCC message content intact.

The RPU 14 communicates directly with the primary MUX card via the BCC channel provided by a T1 span trunk 28. This message path involves only one physical link, and no protocol conversion is required.

The message path between the RPU 14 and the secondary MUX cards and the CCUs 23 involves two hops, these messages are always intercepted by the primary MUX card. It is the task of the primary MUX card to convert the protocol as required, while leaving the BCC message content unchanged.

The BCC Span link protocol describes the communications format for sending data between the RPU 14 and the primary MUX card. Both byte and message level synchronization is performed. The two types of characters transmitted over this link are control and data characters. All characters have the least significant bit set to satisfy the 1's density, and to ensure that the character is not interpreted as a link control character by the Model 1218 concentratorswitch in the concentrator 13.

The BCC Bus 32 protocol describes the communications format for sending data between the primary MUX card and the secondary MUX cards and the CCUs 23.

The serial protocol used is Synchronous Data Link Control (SDLC). With an SDLC protocol, the primary MUX card controls the overall BCC bus 32 and issues commands to the secondary MUX cards and the CCUs. The microcontroller 44 of the primary MUX card controls all of the MUX cards 19 on the BCC bus 32. The SIU of the microcontroller 44 is designed to perform serial communications with little or no CPU involvement. The SIU hardware supports the SDLC protocol and causes zero bit insertion/deletion. Address recognition, cyclic redundancy check (CRC), and frame number sequence checks are automatically performed.

The secondary MUX cards' SIU operate in an Auto mode, where the SIU performs in hardware a subset of the SDLC protocol called the Normal Response Mode (NRM). The Auto mode enables the SIU to recognize and respond to certain kinds of SDLC frames without intervention from the microcontroller's CPU. It also provides a faster turnaround time and a simplified software interface. In Auto mode, the microcontroller 44 can act only as a NRM secondary MUX card, meaning it can transmit only when instructed to do so by the primary MUX card. All such Auto mode responses adhere strictly to IBM's SDLC definitions.

In its Flexible mode, the microcontroller 44 can initiate transmissions without being polled, and thus it can act as the primary MUX card. The primary MUX card SIU is therefore operated in its Flexible (Non-Auto) mode. In the Flexible mode, reception and transmission of each frame by the SIU is performed under control of the CPU.

In both the Auto and Flexible modes, short frames, aborted frames, or frames which have had bad CRC's are ignored by the SIU. The SDLC protocol is designed to limit the necessary buffering of messages to one in each direction, therefore limiting the number of outstanding messages (i.e., unacknowledged) to one in each direction of transmission.

The BCC bus message consists of the basic formatted SDLC frame.

Every MUX card 19 and CCU 23, including the primary MUX card, is assigned a unique station address. The primary MUX card uses the Station Address byte to determine the destination of the message. Each of the secondary MUX cards and the CCUs uses this byte in a response to identify itself as the secondary station that is transmitting.

Figure 6:
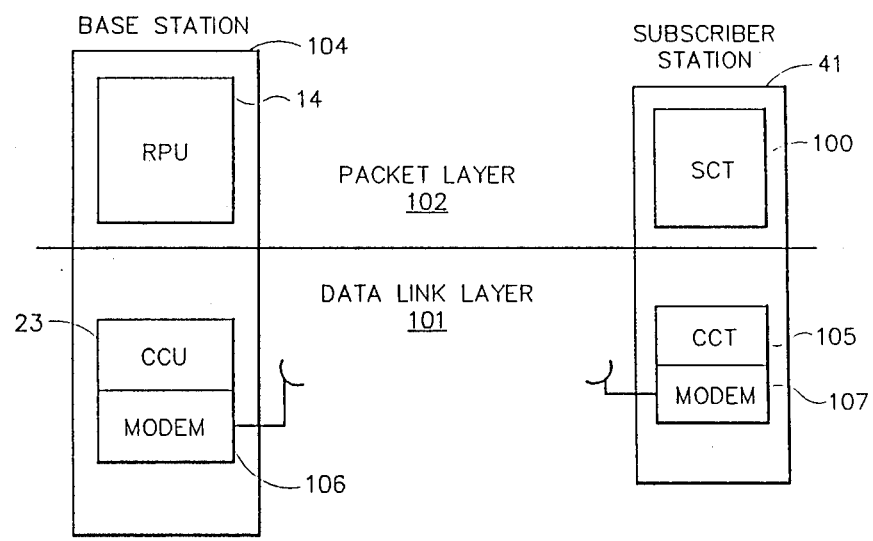
FIG. 6 illustrates the layers of communications between the base station of FIG. 1 and each subscriber stations.

Referring to FIG. 6, the selection and assignment of a voice channel for a given subscriber station 41 is accomplished by the exchange of RCC messages (i.e., data messages) between a Subscriber Control Task (SCT) software-implemented module 100 in the subscriber station 20 and the RPU 14 over the RCC.

The RCC protocol consists of two layers of protocol, a Data Link Layer 101 and a Packet Layer 102. The Data Link Layer 101 is responsible for work synchronization and framing, detection and resolution of collisions, and error detection. The Data Link Layer 101 consists of the Unique Word, Link Field, and Checksum Field. The Packet Layer 102 is responsible for addressing and call establishment information. The Packet Layer 102 consists of the Subscriber Identification, Command, and Call Establishment Data.

The implementation of the RCC protocol is divided. The Packet Layer 102 is implemented in each subscriber station SCT module 100 and at the Base Station 104 in the RPU 14. The Data Link Layer 101 is implemented by the CCU 23 in the RCC channel module at the base station 104 and by a Channel Control Task (CCT) software-implemented module 105 at each subscriber station 41. The CCU 23 and the CCTs 105 are respectively connected to modems 106 and 107 for communicating with each other.

The Packet Layer 102 is used for call-establishment data and communicates information that is used to establish voice connections. Each packet contains one of several permissible codes indicating the operation to be performed on the basis of the packet.

The Data Link Layer 101 provides for collision (conflicting contention for same time slot on same RF channel) resolution, timing between incoming and outgoing frames, and per-operation status information for use by higher-level error recovery procedures. The main purpose of the Data Link Layer is divided into two sublayers, (1) data encapsulation, which provides framing and error detection; and (2) link management, which provides channel allocation and collision resolution.

The CCU 23 and all CCTs 105 that are listening on the RCC must exhaustively check for a valid RCC message in every RCC slot. The CCT performs this task by scanning for the unique word in a window $\pm 4$ symbols about the nominal UW location, based upon master system timing. The CCU listening on the RCC scans for the unique word in a window $\pm 3$ symbols about the nominal UW location. The search algorithm shifts the data until it finds the UW pattern, or until all possibilities have been exhausted. Once the UW pattern is found, the RCC message is considered valid only if the RCC checksum is correct. At the base station 104, the shift information, RCC message and power information are sent to the RPU 14 following a successful search. The subscriber station 41 uses the shift information to align its receive clock with the base station's master clock. Subsequent RCC messages are then transferred to the SCT 100 for processing.

When a subscriber station 41 attempts to transmit on the reverse control channel after a power-up or reset operation or after a long period of listen only operation, it must quickly and accurately determine the correct transmit power level. Ranging and atmospheric effects may make initial communication with the base station 104 impossible until the subscriber station's transmit power is adjusted to be within a required gain window.

The power level determination must also ensure that the subscriber station 41 does not transmit with too much power since its transmission can interfere with the transmissions of other subscribers.

To facilitate this initial adjustment, the base station CCU 23 feeds back a coarse measure of reverse channel RCC power in every forward channel RCC burst. Each reverse channel burst received by the base station 104 shall have its respective AGC level quantized into one of four values. The quantized level is transmitted in the forward channel burst immediately following channel reception. Two bits in RCC link byte #1 are reserved for this purpose. The power information is transmitted independent of whether or not the reverse channel burst is successfully decoded. The power level value is also totally independent of the actual content of the forward channel RCC burst.

The power level information is not used if the subscriber station 41 receives a valid RCC acknowlegement from the base station CCU 23 following reverse channel RCC transmission. Power and timing information fed back later, as part of the RPU 14 reply, is used to make the proper adjustment.

If the subscriber station 41 does not receive a positive RCC acknowledgement from the base station CCU 23 as expected, the power feedback value is used to determine a local transmit power adjustment.

A subscriber station 41 detects a collision by monitoring the RCC message in the forward channel after having transmitted in the previous frame on the reverse channel. If the subscriber station determines that a collision has occurred, the subscriber station performs the collision backoff algorithm. The same station CCU 23 acknowledges a transmission by echoing the received RCC message back over the forward channel, setting the Burst Type bits in RCC link byte #1 to RCC Acknowledge to flag the message as an ACK.

When a transmission attempt has terminated due to a collision, it is retried by the subscriber station 41 until it is successful, or four attempts (the original attempt plus three retries) have been made and all have been terminated due to collisions. Note that all attempts to transmit a given frame are completed before any subsequent frames are transmitted. The scheduling of the retransmissions is determined by a controlled randomization process. When a subscriber station 41 detects a collision, it delays an integral number of slot times before attempting to retransmit. If all four attempts fail, then an error is reported.

A CCITT Cyclic Redundancy Check (CRC) is used to detect errors that occur during the transmission of the RCC messages. The CRC algorithm involves the division of a block of data by a predefined bit sequence and the transmission of a remainder of that division as a part of the data block. The polynomial to generate the 16-bit CCITT CRC is of the form:

$$P(x) = 1 + x^5 + x^{12} + x^{16} \quad \text{(Eq. 1)}$$

The RPU 14 causes connections between a given external communication network port and a given subscriber station 41 to be completed over a time slot assigned in response to the monitored status in accordance with a predetermined assignment routine. The CCU's 23 are coupled to the MUX cards 19 for coupling assigned time slots to given subscriber stations, with each CCU 23 coupling a plurality of assigned time slots to a corresponding plurality of subscriber stations 41.

The predetermined assignment routine includes assigning all of the time slots associated with a given CCU 23 before assigning time slots associated with another active CCU 23, and then assigning time slots associated with a CCU 23 coupled to a different MUX card 19 than the MUX card coupled to the CCU 23 associated with the immediately previously assigned time slots. In accordance with this predetermined assignment routine, the selection criteria are to conserve power by limiting the number of power amplifiers 21 that are in use, to spread the communication assignments among the different T1 trunks 28, and to avoid the first time slot of the T1 trunks, since it is desired to reserve the first time slot of the T1 trunks for use as a back-up BCC link should the primary BCC link become inoperative.

When a time slot assignment requirement arises, first there is a search for a vacant time slot in an already active RF channel. All T1 spans are scanned, beginning with the T1 trunk coupled to the MUX card coupled to the CCU for which the last RF channel was allocated. When there are no vacant time slots in any of the already active RF channels coupled to the T1 span that is being scanned, then the search proceeds to a different T1 span. When there are no vacant time slots in any of the already active RF channels coupled to any of the different T1 spans, then a search is made for an unused RF channel coupled by a CCU and a MUX card to a T1 trunk for a T1 span other than the T1 span coupled to the CCU for which the last RF channel was activated. If there are no vacant time slots for an unused RF channel coupled to any of the other T1 spans, then the search for an unused RF channel proceeds to the T1 span coupled to the CCU for which the last time slot was activated.

Referring to FIG. 1, the echo canceller units 16 cancel echoes in voice signals communicated over the trunk. The RPU 14 is coupled to the echo cancelers 16 by line 110 for enabling the operation of the echo cancelers 16 during only those time slots that have been assigned by the RPU to carry voice signals.

We claim:

1. A base station in a subscriber communication network for communicating signals between subscriber stations and an external communication network having a plurality of ports, comprising
   a communication circuit including
      a trunk for providing a communication channel and
      a multiplexer coupled to the trunk for providing multiple sequentially repetitive time slots in the communication channel for enabling simultaneous communications between a plurality of the ports and a plurality of the subscriber stations over the communication channel;
   an exchange for connecting the trunk to the external communication network ports; and
   a remote-connection processor coupled to the trunk in the communication circuit by a base-station control channel and to the exchange for monitoring the status of the time slots and for causing the communication circuit and the exchange to complete a connection between a given external communication network port and a given subscriber station over a time slot assigned in response to said monitored status in accordance with a predetermined assignment routine;
   wherein the communication circuit further comprises trunk 28. This message path involves only one physical link, and no protocol conversion is required.

The message path between the RPU 14 and the secondary MUX cards and the CCUs 23 involves two hops, these messages are always intercepted by the primary MUX card. It is the task of the primary MUX card to convert the protocol as required, while leaving the BCC message content unchanged.

The BCC Span link protocol describes the communications format for sending data between the RPU 14 and the primary MUX card. Both byte and message level synchronization is performed. The two types of characters transmitted over this link are control and data characters. All characters have the least significant bit set to satisfy the 1's density, and to ensure that the character is not interpreted as a link control character by the Model 1218 concentratorswitch in the concentrator 13.

The BCC Bus 32 protocol describes the communications format for sending data between the primary MUX card and the secondary MUX cards and the CCUs 23.

The serial protocol used is Synchronous Data Link Control (SDLC). With an SDLC protocol, the primary MUX card controls the overall BCC bus 32 and issues commands to the secondary MUX cards and the CCUs. The microcontroller 44 of the primary MUX card controls all of the MUX cards 19 on the BCC bus 32. The SIU of the microcontroller 44 is designed to perform serial communications with little or no CPU involvement. The SIU hardware supports the SDLC protocol and causes zero bit insertion/deletion. Address recognition, cyclic redundancy check (CRC), and frame number sequence checks are automatically performed.

The secondary MUX cards' SIU operate in an Auto mode, where the SIU performs in hardware a subset of the SDLC protocol called the Normal Response Mode (NRM). The Auto mode enables the SIU to recognize and respond to certain kinds of SDLC frames without intervention from the microcontroller's CPU. It also provides a faster turnaround time and a simplified software interface. In Auto mode, the microcontroller 44 can act only as a NRM secondary MUX card, meaning it can transmit only when instructed to do so by the primary MUX card. All such Auto mode responses adhere strictly to IBM's SDLC definitions.

In its Flexible mode, the microcontroller 44 can initiate transmissions without being polled, and thus it can act as the primary MUX card. The primary MUX card SIU is therefore operated in its Flexible (Non-Auto) mode. In the Flexible mode, reception and transmission of each frame by the SIU is performed under control of the CPU.

In both the Auto and Flexible modes, short frames, aborted frames, or frames which have had bad CRC's are ignored by the SIU. The SDLC protocol is designed to limit the necessary buffering of messages to one in each direction, therefore limiting the number of outstanding messages (i.e., unacknowledged) to one in each direction of transmission.

The BCC bus message consists of the basic formatted SDLC frame.

Every MUX card 19 and CCU 23, including the primary MUX card, is assigned a unique station address. The primary MUX card uses the Station Address byte to determine the destination of the message. Each of the secondary MUX cards and the CCUs uses this byte in a response to identify itself as the secondary station that is transmitting.

Referring to FIG. 6, the selection and assignment of a voice channel for a given subscriber station 41 is accomplished by the exchange of RCC messages (i.e., data messages) between a Subscriber Control Task (SCT) software-implemented module 100 in the subscriber station 20 and the RPU 14 over the RCC.

The RCC protocol consists of two layers of protocol, a Data Link Layer 101 and a Packet Layer 102. The Data Link Layer 101 is responsible for work synchronization and framing, detection and resolution of collisions, and error detection. The Data Link Layer 101 consists of the Unique Word, Link Field, and Checksum Field. The Packet Layer 102 is responsible for addressing and call establishment information. The Packet Layer 102 consists of the Subscriber Identification, Command, and Call Establishment Data.

The implementation of the RCC protocol is divided. The Packet Layer 102 is implemented in each subscriber station SCT module 100 and at the Base Station 104 in the RPU 14. The Data Link Layer 101 is implemented by the CCU 23 in the RCC channel module at the base station 104 and by a Channel Control Task (CCT) software-implemented module 105 at each subscriber station 41. The CCU 23 and the CCTs 105 are respectively connected to modems 106 and 107 for communicating with each other.

The Packet Layer 102 is used for call-establishment data and communicates information that is used to establish voice connections. Each packet contains one of several permissible codes indicating the operation to be performed on the basis of the packet.

The Data Link Layer 101 provides for collision (conflicting contention for same time slot on same RF channel) resolution, timing between incoming and outgoing frames, and per-operation status information for use by higher-level error recovery procedures. The main purpose of the Data Link Layer is divided into two sublayers, (1) data encapsulation, which provides framing and error detection; and (2) link management, which provides channel allocation and collision resolution.

The CCU 23 and all CCTs 105 that are listening on the RCC must exhaustively check for a valid RCC message in every RCC slot. The CCT performs this task by scanning for the unique word in a window ±4 symbols about the nominal UW location, based upon master system timing. The CCU listening on the RCC scans for the unique word in a window ±3 symbols about the nominal UW location. The search algorithm shifts the data until it finds the UW pattern, or until all possibilities have been exhausted. Once the UW pattern is found, the RCC message is considered valid only if the RCC checksum is correct. At the base station 104, the shift information, RCC message and power information are sent to the RPU 14 following a successful search. The subscriber station 41 uses the shift information to align its receive clock with the base station's master clock. Subsequent RCC messages are then transferred to the SCT 100 for processing.

When a subscriber station 41 attempts to transmit on the reverse control channel after a power-up or reset operation or after a long period of listen only operation, it must quickly and accurately determine the correct transmit power level. Ranging and atmospheric effects may make initial communication with the base station 104 impossible until the subscriber station's transmit power is adjusted to be within a required gain window.

The power level determination must also ensure that the subscriber station 41 does not transmit with too much power since its transmission can interfere with the transmissions of other subscribers.

To facilitate this initial adjustment, the base station CCU 23 feeds back a coarse measure of reverse channel RCC power in every forward channel RCC burst. Each reverse channel burst received by the base station 104 shall have its respective AGC level quantized into one of four values. The quantized level is transmitted in the forward channel burst immediately following channel reception. Two bits in RCC link byte #1 are reserved for this purpose. The power information is transmitted independent of whether or not the reverse channel burst is successfully decoded. The power level value is also totally independent of the actual content of the forward channel RCC burst.

The power level information is not used if the subscriber station 41 receives a valid RCC acknowlegement from the base station CCU 23 following reverse channel RCC transmission. Power and timing information fed back later, as part of the RPU 14 reply, is used to make the proper adjustment.

If the subscriber station 41 does not receive a positive RCC acknowledgement from the base station CCU 23 as expected, the power feedback value is used to determine a local transmit power adjustment.

A subscriber station 41 detects a collision by monitoring the RCC message in the forward channel after having transmitted in the previous frame on the reverse channel. If the subscriber station determines that a collision has occurred, the subscriber station performs the collision backoff algorithm. The same station CCU 23 acknowledges a transmission by echoing the received RCC message back over the forward channel, setting the Burst Type bits in RCC link byte #1 to RCC Acknowledge to flag the message as an ACK.

When a transmission attempt has terminated due to a collision, it is retried by the subscriber station 41 until it is successful, or four attempts (the original attempt plus three retries) have been made and all have been terminated due to collisions. Note that all attempts to transmit a given frame are completed before any subsequent frames are transmitted. The scheduling of the retransmissions is determined by a controlled randomization process. When a subscriber station 41 detects a collision, it delays an integral number of slot times before attempting to retransmit. If all four attempts fail, then an error is reported.

A CCITT Cyclic Redundancy Check (CRC) is used to detect errors that occur during the transmission of the RCC messages. The CRC algorithm involves the division of a block of data by a predefined bit sequence and the transmission of a remainder of that division as a part of the data block. The polynomial to generate the 16-bit CCITT CRC is of the form:

$$P(x) = 1 + x^5 + x^{12} + x^{16} \qquad \text{(Eq. 1)}$$

The RPU 14 causes connections between a given external communication network port and a given subscriber station 41 to be completed over a time slot assigned in response to the monitored status in accordance with a predetermined assignment routine. The CCU's 23 are coupled to the MUX cards 19 for coupling assigned time slots to given subscriber stations, with each CCU 23 coupling a plurality of assigned time slots to a corresponding plurality of subscriber stations 41.

The predetermined assignment routine includes assigning all of the time slots associated with a given CCU 23 before assigning time slots associated with another active CCU 23, and then assigning time slots associated with a CCU 23 coupled to a different MUX card 19 than the MUX card coupled to the CCU 23 associated with the immediately previously assigned time slots. In accordance with this predetermined assignment routine, the selection criteria are to conserve power by limiting the number of power amplifiers 21 that are in use, to spread the communication assignments among the different T1 trunks 28, and to avoid the first time slot of the T1 trunks, since it is desired to reserve the first time slot of the T1 trunks for use as a back-up BCC link should the primary BCC link become inoperative.

When a time slot assignment requirement arises, first there is a search for a vacant time slot in an already active RF channel. All T1 spans are scanned, beginning with the T1 trunk coupled to the MUX card coupled to the CCU for which the last RF channel was allocated. When there are no vacant time slots in any of the already active RF channels coupled to the T1 span that is being scanned, then the search proceeds to a different T1 span. When there are no vacant time slots in any of the already active RF channels coupled to any of the different T1 spans, then a search is made for an unused RF channel coupled by a CCU and a MUX card to a T1 trunk for a T1 span other than the T1 span coupled to the CCU for which the last RF channel was activated. If there are no vacant time slots for an unused RF channel coupled to any of the other T1 spans, then the search for an unused RF channel proceeds to the T1 span coupled to the CCU for which the last time slot was activated.

Referring to FIG. 1, the echo canceller units 16 cancel echoes in voice signals communicated over the trunk. The RPU 14 is coupled to the echo cancelers 16 by line 110 for enabling the operation of the echo cancelers 16 during only those time slots that have been assigned by the RPU to carry voice signals.

We claim:

1. A base station in a subscriber communication network for communicating signals between subscriber stations and an external communication network having a plurality of ports, comprising a communication circuit including a trunk for providing a communication channel and a multiplexer coupled to the trunk for providing multiple sequentially repetitive time slots in the communication channel for enabling simultaneous communications between a plurality of the ports and a plurality of the subscriber stations over the communication channel;

an exchange for connecting the trunk to the external communication network ports; and a remote-connection processor coupled to the trunk in the communication circuit by a base-station control channel and to the exchange for monitoring the status of the time slots and for causing the communication circuit and the exchange to complete a connection between a given external communication network port and a given subscriber station over a time slot assigned in response to said monitored status in accordance with a predetermined assignment routine;

wherein the communication circuit further comprises a plurality of channel control units coupled to the multiplexer for coupling assigned time slots to given subscriber stations and a plurality of communication signal processors coupled to given subscriber stations by the channel control units in response to command signals from the remote-connection processor, wherein the communication signal processors are respectively coupled by the multiplexer to predetermined time slots of the communication channel carried over the trunk, and each communication signal processor provides a predetermined signal pattern in its predetermined time slot when not coupled by its channel control unit to the remoteconnection processor;

wherein the exchange is responsive to a command from the remote-connection processor for causing a signal received by the exchange from one of the communication signal processors over a given time slot to be looped back to the communication signal processor coupled to that time slot; and wherein each communication signal processor is coupled to one of the channel control units for enabling the coupled channel control unit in response to said looped-back predetermined signal pattern to receive commands from the remote-connection processor for assigning the communication signal processor that receives the looped-back predetermined signal pattern to communicate with a given subscriber station.

2. A base station according to claim 1,
wherein the remote-connection processor means for assigning a given time slot to a given subscriber station, said assigning means including means for commanding the exchange to loop back signals received from the communication signal processor coupled to the given time slot;

means for sending an address initialization signal over the base-station control channel to all of the channel control units to store an address associated with the given subscriber station in the channel control unit that is enabled in response to the communication signal processor coupled thereto receiving said looped-back predetermined signal pattern; and means for commanding the channel control unit in which the address is stored to assign the given-time-slot-coupled communication signal processor to the given subscriber station.

3. A base station according to claim 2,
wherein each channel control unit includes means for responding to storage of a said address by sending an acknowledgement to the remote-connection processor; and wherein the remote-connection processor further includes means for commanding the exchange to loop back signals received from the communication signal processor coupled to a different given time slot when no acknowledgement is received from the channel control unit coupled to the communication signal processor coupled to the first-recited given time slot.

4. A base station in a subscriber communication network for communicating signals between subscriber stations and an external communication network having a plurality of ports, comprising
a communication circuit including
a trunk for providing a communication channel and a multiplexer coupled to the trunk for providing multiple sequentially repetitive time slots in the communication channel for enabling simultaneous communications between a plurality of the ports and a plurality of the subscriber stations over the communication channel;

an exchange for connecting the trunk to the external communication network ports; and a remote-connection processor coupled to the trunk in the communication circuit by a base-station control channel (BCC), which occupies one of the time slots, and to the exchange for monitoring the status of the time slots for causing the communication circuit and the exchange to complete a connection between a given external communication network port and a given subscriber station over a time slot assigned in response to said monitored status in accordance with a predetermined assignment routine;

wherein the communication circuit further comprises
a plurality of channel control units coupled to the multiplexer for coupling assigned time slots to given subscriber stations; and wherein one of the channel control units communicates control signals between the BCC and all of the subscriber stations over a radio control channel allocated to a given time slot of a given frequency channel by the remote-connection processor in response to said monitored status in accordance with a predetermined allocation routine in which the first priority is given to the time slot of the radio frequency channel that is coincident with the time slot occupied by the base-station control channel.

5. A base station in a subscriber communication network for communicating signals between subscriber stations and an external communication network having a plurality of ports, comprising
a communication circuit including
a plurality of trunks for providing a plurality of communication channels and a plurality of multiplexers coupled to the plurality of trunks for providing multiple sequentially repetitive time slots in each of the communication channels for enabling simultaneous communications between a plurality of the ports and a plurality of the subscriber stations over the communication channels;

an exchange for connecting the trunks to the external communication network ports; and a remote-connection processor coupled to the trunks in the communication circuit by a base-station control channel (BCC), which occupies one of the time slots, and to the exchange for monitoring the status of the time slots and for causing the communication circuit and the exchange to complete a connection between a given external communication network port and a given subscriber station over a time slot assigned in response to said monitored status in accordance with a predetermined assignment routine;

wherein the communication circuit further comprises
a plurality of channel control units coupled to the multiplexers for coupling assigned time slots to given subscriber stations;

a plurality of controllers respectively coupled to the multiplexers and a local bus between the controllers and the channel control units; and wherein, in accordance with said monitored status, the remote-connection processor selects one of the time slots to carry the base-station control channel and causes the controller that is coupled to the multiplexer that is coupled to the trunk that carries the time slot selected to carry the base-station control channel to function as a primary controller for coupling the base-station control channel over the local bus to the other controllers and to the channel control units for enabling the remote-connection processor to monitor the status of the other time slots and to assign the other time slots.

6. A base station according to claim 5, wherein the communication circuit includes a plurality of communication signal processors coupled to given subscriber stations by the channel control units in response to command signals from the remote-connection processor, wherein the communication signal processors are respectively coupled by the multiplexers to predetermined time slots of predetermined communication channels carried over the trunks, and each communication signal processor provides a predetermined signal pattern in its predetermmined time slot when not coupled by its channel control unit to the remote-connection processor;

wherein the exchange is responsive to a command from the remote-connection processor for causing a signal received by the exchange from one of the communication signal processors over a given time slot to be looped back to the communication signal processor coupled to that time slot; and wherein each communication signal processor is coupled to one of the channel control units for enabling the coupled channel control unit in response to a said looped-back predetermined signal pattern to receive commands from the remote-connection processor for assigning the communication signal processor that receives the looped-back predetermined signal pattern to communicate with a given suscriber station.

7. A base station according to claim 6, wherein the remote-connection processor comprises means for assigning a given time slot to a given subscriber station, said assigning means including means for commanding the exchange to loop back signals received from the communication signal processor coupled to the given time slot;

means for sending an address initialization signal over the base-station control channel to all of the channel control units to store an address associated with the given subscriber station in the channel control unit that is enabled in response to the communication signal processor coupled thereto receiving said looped-back predetermined signal pattern; and means for commanding the channel control unit in which the address is stored to assign the given-time-slot coupled communication signal processor to the given subscriber station.

8. A base station according to claim 7, wherein each channel control unit includes means for responding to storage of a said address by sending an acknowledgement to the remote-connection processor; and wherein the remote-connection processor further includes means for commanding the exchange to loop back signals received from the communication signal processor coupled to a different given time slot when no acknowledgement is received from the channel control unit coupled to the communication signal processor coupled to the first-recited given time slot.

9. A base station according to claim 5, wherein one of the channel control units communicates control signals between the BCC and all of the subscriber stations over a radio control channel allocated to a given time slot of a given frequency channel by the remote-connection processor in response to said monitored status in accordance with a predetermined allocation routine in which the first priority is given to the time slot of the radio frequency channel that is coincident with the time slot occupied by the base-station control channel.

10. A base station according to claim 5, wherein the multiplexers and the channel control units are modular for enabling their addition to and removal from the system in accordance with changes in the number of subscriber stations with which the base station communicates.

11. A base station in a subscriber communication network for communicating signals between subscriber stations and an external communication network having a plurality of ports, comprising a communication circuit including a plurality of trunks for providing a plurality of communication channels and a plurality of multiplexers coupled to the plurality of trunks for providing multiple sequentially repetitive time slots in each of the communication channels for enabling simultaneous communications between a plurality of the ports and a plurality of the subscriber stations over the communication channels;

an exchange for connecting the trunks to the external communication network ports; and a remote-connection processor coupled to the trunks in the communication circuit by a base-station control channel and to the exchange for monitoring the status of the time slots and for causing the communication circuit and the exchange to complete a connection between a given external communication network port and a given subscriber station over a time slot assigned in response to said monitored status in accordance with a predetermined assignment routine;

wherein the communication circuit further comprises a plurality of channel control units coupled to the multiplexers for coupling assigned time slots to given subscriber stations, with each channel control unit coupling a plurality of assigned time slots to a corresponding plurality of subscriber stations;

wherein said assignment routine includes assigning all of the time slots associated with a given channel control unit before assigning time slots associated with another channel control unit, and then assigning time slots associated with a channel control unit coupled to a different multiplexer than the multiplexer coupled to the channel control unit associated with the immediately previously assigned time slots.

12. A base station in a subscriber communication network for communicating signals between subscriber stations and an external communication network having a plurality of ports, comprising a communication circuit including a trunk for providing a communication channel and a multiplexer coupled to the trunk for providing multiple sequentially repetitive time slots in the communication channel for enabling simultaneous communications of digital information signals between a plurality of the ports and a plurality of the subscriber stations over the communication channel;

an exchange for connecting the trunk to the external communication network ports; and a remote-connection processor coupled to the trunk in the communication circuit by a base-station control channel and to the exchange for monitoring the status of the time slots and for causing the communication circuit and the exchange to complete a connection between a given external communication network port and a given subscriber station over a time slot assigned in response to said monitored status in accordance with a predetermined assignment routine;

wherein the communication circuit further comprises a plurality of channel control units coupled to the multiplexer for coupling assigned time slots to given subscriber stations via radio frequency channels and a plurality of channel control units coupled to given subscriber stations by the channel control units in response to command signals from the remote-connection processor, wherein the communication signal processor are respectively coupled by the multiplexer to predetermined time slots of the communication channel carried over the trunk and by the channel control units to given time slots of the radio frequency channels.

13. A base station according to claim 12,
wherein the exchange comprises a concentrator.

14. A base station according to claim 12,
wherein means are provided to decrease jitter and to control slips in the received signals, said means comprising a frame buffer containing a plurality of frames wherein a selected address within each frame corresponds to a selected channel assignment, said frames having an initial predetermined separation.

15. A base station according to claim 12, further comprising an echo canceller for cancelling echoes in voice signals communicated over the trunk;

wherein the remote-connection processor is coupled to the echo canceller for enabling the operation of the echo canceller during only those time slots that have been assigned by the remote-connection processor to carry voice signals.

* * * * *

UNITED STATES PATENT AND TRADEMARK OFFICE
CERTIFICATE OF CORRECTION

PATENT NO. : 4,777,633
DATED : October 11, 1988
INVENTOR(S) : Fletcher et al.

It is certified that error appears in the above-identified patent and that said Letters Patent is hereby corrected as shown below:

In claim 12;

Column 29, line 26, "channel control units" should read --communication signal processors--;.

Column 30, line 3, "processor" should read --processors--.

Signed and Sealed this

Twelfth Day of April, 1994

Attest:

BRUCE LEHMAN

Attesting Officer

Commissioner of Patents and Trademarks